March 10, 1936.   V. H. HANCOCK   2,033,573
LENS
Filed June 12, 1931   2 Sheets-Sheet 1

INVENTOR
VIRGIL H. HANCOCK.
BY
ATTORNEYS

March 10, 1936.  V. H. HANCOCK  2,033,573
LENS
Filed June 12, 1931  2 Sheets-Sheet 2

INVENTOR
VIRGIL H. HANCOCK.
BY
ATTORNEYS

Patented Mar. 10, 1936

2,033,573

UNITED STATES PATENT OFFICE 2,033,573

LENS

Virgil H. Hancock, New Orleans, La., assignor to The Univis Corporation, Dayton, Ohio, a corporation of Delaware Application June 12, 1931, Serial No. 544,005

6 Claims. (Cl. 88—54)

My invention relates to improvements in lenses and has particular reference to an improved construction of lenses of the multifocal or trifocal types.

One of the leading objects of my present invention is the provision of an improved construction of lenses of the fused type, which shall embody a plurality of foci to satisfactorily correct the vision of the wearer, as for distant vision, for intermediate vision, and for near vision.

A further object of the invention is the provision of an improved construction of trifocal lenses which may be readily and simply formed with a minimum amount of grinding and fusing labor.

A further object of the invention is to provide a lens which shall embody and offer a distant vision portion, an intermediate vision portion, and a lower reading portion, thereby enabling the wearer to obtain clear vision at a distance of seven feet or more, clear vision at a distance of two or three feet, and clear reading or near vision at approximately fourteen inches.

Another object of the invention is to provide an improvement in employing, in trifocals, glass of different indices of refraction.

A further object of the invention is the provision of an improved lens of the trifocal type which shall eliminate or reduce prismatic displacement in both the intermediate and near or reading portions, which displacement causes an apparent shifting of objects to the great annoyance, discomfort, and actual danger to the wearer of multifocals. It is my understanding that other trifocals falling under the term of prior art, whether of one piece, homogeneous construction or of fused construction, possess in both the intermediate vision and reading portions an amount of prismatic effect annoying to the wearer and often times causing eye discomfort. My improvement in design and construction permits the wearer of the low-powered lenses worn by the great majority of patients to look through the exact optical center of the intermediate vision portion through which point objects are viewed in a perfectly natural position and with no displacement such as other trifocals afford. It is my understanding that other trifocals are so constructed that the optical center of the intermediate vision portion is often times at a point without or outside of the finished lens as worn by the wearer. My improvement in design and construction permits the wearer of such lenses also to read through the exact optical center of the near vision portion, through which point the reading matter is viewed without displacement. It is my understanding that other trifocals are so constructed that the optical center of the reading portion cannot coincide with the point through which the wearer reads. Furthermore, in prescriptions calling for extremely strong concave lenses, my construction makes the amount of this prismatic displacement much less than in prior art trifocals.

Other objects and advantages of my improved trifocal lenses, and new manner of forming the same, should be readily apparent by reference to the following specification taken in connection with the accompanying drawings, and it will be understood that I may make any modifications in the specific details of construction shown and described within the scope of the appended claims without departing from or exceeding the spirit of my invention.

Similar reference numerals throughout the several views indicate the same or equivalent parts.

Figure 1:
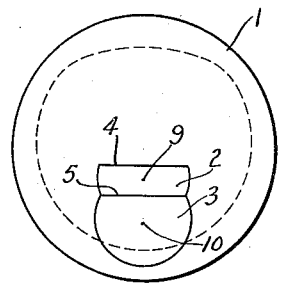
Figure 1 is a plan view of the trifocal lens blank of my invention, with the outline of the finished lens indicated by a dotted line.

Referring to the drawings in detail, 1 is a major lens blank or major portion which when surfaced on both sides with surface curvatures suitable for the individual prescription becomes the major lens. Secured within a recess in one of its surfaces is a bipartite insert of other-than-circular outline and higher refractive index than the major portion and including two minor parts, upper part 2 being preferably adapted for intermediate vision and lower part 3 for near vision. By an obvious variation in the data for the insert, as hereinafter explained, the two portions may be interchanged, so that the upper part 2 becomes adapted for near vision and the lower part 3 becomes adapted for intermediate vision. The first-mentioned, however, is the usual, most useful and hence preferred arrangement of the two minor fields. The exposed surface of all three portions 1, 2 and 3 is a spherical continuous surface.

The boundary line between one of these inserted parts and the major lens is seen to be variably curved, in some sections being flatter than others; that is, the radius of the outline curve is not constant as in a circular segment. In other words, the said boundary line has a discontinuous or interrupted direction as distinguished from the continuous, uninterrupted direction of a boundary whose outline is the arc of a circle. The insert as a whole and also one of its parts thus has a variable outline, in contrast with the non-variable, regular outline of a circular insert.

In the lens of my present invention the two minor portions 2 and 3 are composed of materials having the same refractive index, but of higher refractive index than the major portion 1, and the recess is divided into parts of two different curvatures.

The nearness of the upper and lower sections of the boundaries or dividing lines to the optical centers of their respective inserts also reduces the change of prismatic effect on crossing those boundaries, and eliminates the annoyance of the "image jump" or image displacement so annoying to the wearer in many prior art multifocal lens. The small amount of image jump remaining is further reduced by the fact that the addition of power at each dividing line is only half of that in the ordinary bifocal, hence the addition is applied in easy steps. Furthermore, the wearer of my trifocal avoids the sudden blur shock on crossing the dividing line which he encounters in bifocals, even bifocals made to reduce the positional jump of the image. The jump in magnification is likewise reduced.

The maximum width of visual field is also presented to the wearer at the level where he will most readily use it. This further reduces the prismatic image jump by reducing the total diameter necessary for the segment. In many prior art multifocals of the arched dividing line type, it has been necessary to use much larger diameters of segments in order to provide the wearer with sufficiently wide visual fields at the levels where he uses his lenses for the most part, namely, immediately below the tops of the respective inserts.

Figure 2:
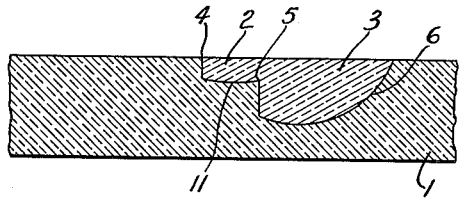
Figure 2 is an enlarged portion of a central vertical section of the trifocal lens blank in Figure 1, showing the insert secured in the recess of the distance portion.
Figure 3:
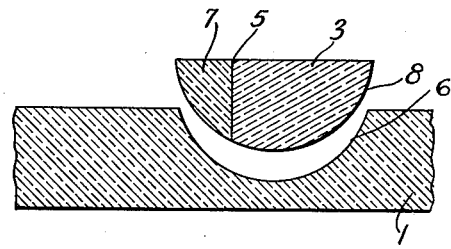
Figure 3 is an enlarged portion of a central vertical section of the major blank in Figure 1, showing the recess therein, and above it the first insert about to be secured in the first recess.
Figure 4:
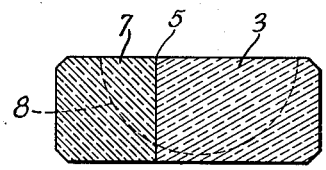
Figure 4 is a central vertical section of the composite "button" from which the first insert of Figure 3 is made, with the lower surface of the insert indicated by a dotted line.

In producing the lens of my invention (see Figures 1 to 6, inclusive) a blank 1, preferably of low index crown glass, is prepared with a spherical recess or countersink 6 in one of its surfaces, as shown in Figure 3. The insert which is to be placed in the recess 6 is prepared by uniting two pieces of glass edge-to-edge to form the button shown in Figure 4, the part 7 being of glass of the same low index of refraction as the major blank 1, and preferably the same glass, whereas the part 3 is of a high index glass. The edge-uniting of these two portions is customarily performed by a furnace-fusing method well known to those skilled in the art.

The composite button thus made (Fig. 4) is then annealed, and surfaced on one side to a curvature 8 (shown in dotted lines of Fig. 4) which is substantially the counterpart of the recess 6. The first insert thus formed is shown above the recess 6 in Figure 3, and is now secured in that recess, preferably by the usual furnace-fusing process, and is then annealed. The portion 7, being of the same index glass as the major portion 1, becomes invisibly united therewith, leaving visible only the portion 3 and a buried visible edge 5.

Figure 6:
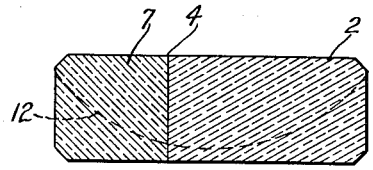
Figure 6 is a central vertical section of the composite button from which the second insert of Figure 5 is made, with the lower surface of the insert indicated by a dotted line.
Figure 5:
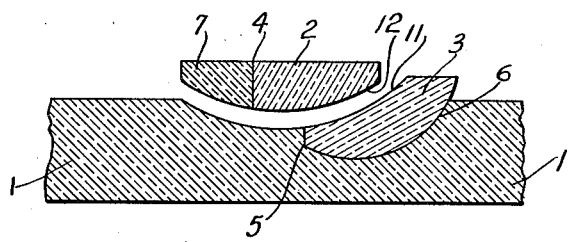
Figure 5 is an enlarged portion of the blank shown in Figure 4 after the first insert has been secured in the first recess, a second recess made above the first recess by removing a portion of the first insert, and above it a second insert about to be secured in the second recess.

This partially-completed blank is now provided with a second recess 11 superposed on the first insert 3, as shown in Figure 5. Into this second recess 11 is then secured a second insert, shown in Figure 5. This second insert is prepared by uniting a piece of low-index glass 7 edge-to-edge with a piece of high index glass 2, preferably by furnace fusing, as shown in Figure 6. The low index portion 7 is made of glass of the same refractive index as the major blank, hence unites with it and becomes invisible except for the buried edge 4 where it joins the portion 2. Here the portion 2 is made of glass of the same refractive index as the portion 3, hence becomes invisibly joined with portion 3. The exposed surface of the segment side of the blank is then surfaced, and the whole acquires the appearance shown in Figures 1 and 2.

By this method, it will be apparent that when the recess 11 is made of shallower curvature than the recess 6, the portion 2 which lies between the dividing lines 5 and 4 will have lower additive power than the portion 3 between the dividing line 5 and that portion of the dividing line nearest the bottom edge of the blank 1. If the recess 6 is correctly powered for reading vision by methods of calculation well known to those skilled in the art, by the same method the recess 11 may be made of correct power for intermediate vision.

It is furthermore obvious that by shifting the position of the recess 11 relative to the recess 6, the width, length, shape and position of the band 2 of Figure 5 may be varied relative to portion 3. The power added by the intermediate insert 2 may also be varied independently of the power added by the reading insert 3.

In this lens of my invention, the positional jump of the image on crossing either dividing line 4 or 5 is greatly reduced from the amount present in the ordinary bifocal or trifocal of the prior art.

The positions of the optical centers of the inserts 2 and 3 in Figures 1 and 2 may be varied by merely grinding the inserts with their dividing lines 4 and 5 the desired distances from the optical centers of the inserts. The preferred position of the optical center of the intermediate insert is, however, at the point 9 midway between the dividing lines 4 and 5, while that of the near portion 3 is at the point 10 about 4½ millimeters below the dividing line 5.

In the lens of my present invention, the shape of the upper part of the dividing line 4 between the intermediate portion 2 and the distance portion 1 may be varied by varying the outline of the contacting edges between the pieces 2 and 7 in preparing the "button" or insert, this outline being preferably a horizontal straight line or a flatly arcuate curve. Similarly, the dividing line 5 between the intermediate portion 2 and the near portion 3 may likewise be varied in outline, but is also preferably a horizontal straight line, or a flatly arcuate curve.

The lens of my invention when fused may be ground with smooth or unbroken surfaces on both sides of the lens and the upper portion 1 will provide the usual and ordinary distant vision lens, the portion 2 an intermediate vision lens adapted for use at a distance of two or three feet, while the portion 3 provides a reading or near vision field for about fourteen inches, as shown in Figure 1.

Although I have particularly described my improved trifocal lenses as formed by the uniting of various portions as through fusion, it is to be understood that if preferred the various parts of the segments or buttons as an entirety may be fused together and the button itself cemented in place within the countersink or, if preferred, the several parts of the button itself may be so formed as to properly fit together, uniting one to the other by cementing and the button as an entirety cemented within the countersink without in any wise departing from that feature of my invention relating to the provision of the glass of several indices of refraction so arranged as to present an optically centered intermediate vision insert to form a trifocal lens.

What I claim as new is:—

1. A trifocal lens comprising a major lens, a recess in a surface of said major lens, the surface of said recess being divided into areas of different radii of curvature on different levels at the boundary therebetween, and a non-circular insert of a different index of refraction from the major lens secured within said recess, said insert having portions of different focal powers, one of said portions having a buried shoulder along a part of the boundary separating it from the said major lens.

2. A trifocal lens comprising a major lens, a recess having a surface with two areas of different radii of curvature in one surface of said major lens, and a non-circular insert of a higher refractive index secured within said recess, said insert including portions of different focal powers, one of said inserted portions being separated from said major lens by a boundary having a variable outline with a buried shoulder along a section of said boundary.

3. A trifocal lens comprising a major lens, a recess having a surface with areas of different radii of curvature within a surface of said major lens, and an other-than-circular insert of a higher index of refraction from said major lens secured within said recess, said insert being composed of glass of the same index of refraction throughout, and having an upper part of lesser focal power than the other part of said insert, the external boundary of one part of said insert including sections having differently curved outlines, the uppermost section of said external boundary being substantially horizontal.

4. A trifocal lens comprising a major lens having a recess having a surface including areas of two different radii of curvatures on different levels, and an other-than-circular insert of higher index of refraction secured within said recess, said insert having an upper part with substantially parallel upper and lower boundaries, and a lower part separated from said major lens by a partially circular boundary.

5. The method of making a trifocal lens, which method includes the following steps: Uniting a portion of glass of a low index of refraction edge-to-edge with a portion of glass of a high index of refraction, providing one face of the first insert thus formed with a continuous surface of a single common radius of curvature, surfacing a first recess of curvature corresponding to said first insert face in a major lens blank of the same index of refraction as one part of said first insert, securing said first insert within said first recess; surfacing a second recess in said major lens blank overlapping said first insert in said first recess, preparing a second insert by uniting a piece of glass of the same low index of refraction as the said major lens edge-to-edge with a piece of glass of the same high index of refraction as the high index portion of said first insert, providing said second insert with a surface of substantially the same radius of curvature as said second recess, securing this second insert within the second recess overlapping said first insert in said first recess, and surfacing both sides of the lens blank thus formed to continuous curvatures suitable to form a lens.

6. The process of making a trifocal lens, which process includes the following steps: Preparing a first insert by fusing a piece of glass of low index of refraction, edge-to-edge with a piece of glass of high index of refraction, providing the first insert thus formed with a common surface curvature, forming a first recess of corresponding curvature in a major lens of the same index of refraction as the low index portion of the said first insert, fusing said first insert into said first recess, forming a second insert by fusing a piece of glass of the same low index of refraction as said major lens blank edge-to-edge with a piece of glass of the same high index of refraction as the high index portion of the said first insert, forming a second recess of different curvature from said first recess partially overlapping said first recess, forming a surface of corresponding radius of curvature to said second recess on said second insert, fusing said second insert into said second recess, and surfacing both sides of said lens blank thus formed with curvatures suitable for the wearer's prescription.

VIRGIL H. HANCOCK.